United States Patent
Dogishi et al.

(10) Patent No.: US 11,460,858 B2
(45) Date of Patent: Oct. 4, 2022

(54) INFORMATION PROCESSING DEVICE TO GENERATE A NAVIGATION COMMAND FOR A VEHICLE

(71) Applicant: TOYOTA JIDOSHA KABUSHIKI KAISHA, Toyota (JP)

(72) Inventors: Hiromichi Dogishi, Nagoya (JP); Masaki Shitara, Nagakute (JP); Keiji Yamashita, Nisshin (JP); Nozomi Kaneko, Nagoya (JP); Naoki Yamamuro, Nagoya (JP); Shunsuke Tanimori, Susono (JP); Ryoichi Shiraishi, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 16/708,727

(22) Filed: Dec. 10, 2019

(65) Prior Publication Data
US 2020/0241555 A1 Jul. 30, 2020

(30) Foreign Application Priority Data
Jan. 29, 2019 (JP) .............................. JP2019-013344

(51) Int. Cl.
*G05D 1/02* (2020.01)
*G06Q 10/08* (2012.01)
*G06F 3/04847* (2022.01)

(52) U.S. Cl.
CPC ....... *G05D 1/0274* (2013.01); *G06F 3/04847* (2013.01); *G06Q 10/0833* (2013.01); *G05D 2201/0212* (2013.01)

(58) Field of Classification Search
CPC .......... G05D 1/0274; G05D 2201/0212; G06F 3/04847; G06Q 10/0833
See application file for complete search history.

(56) References Cited

U.S. PATENT DOCUMENTS

| 7,973,788 | B2 * | 7/2011 | Nonclercq | .......... G06F 16/2428 345/419 |
| 8,502,835 | B1 * | 8/2013 | Meehan | .................. G06F 16/58 345/633 |
| 9,852,487 | B1 * | 12/2017 | Farnsworth | ............ G06Q 50/16 |
| 10,242,400 | B1 * | 3/2019 | Eraker | ............... G06Q 30/0643 |
| 11,212,437 | B2 * | 12/2021 | Colin | ..................... H04N 5/247 |

(Continued)

FOREIGN PATENT DOCUMENTS

JP 2018-124676 A 8/2018

*Primary Examiner* — Ramsey Refai
(74) *Attorney, Agent, or Firm* — Oblon, McClelland, Maier & Neustadt, L.L.P.

(57) ABSTRACT

Provided is an information processing device including a controlling portion configured to execute: acquisition of information about a through-point corresponding to a selection object selected by a user terminal from among selection objects installable in a movable body in a base state; acquisition of information about a destination output from the user terminal as a point where a user observes the movable body in a state where the selection object selected by the user terminal is installed; and generation of a navigation command so as to move the movable body to the destination after the selection object selected by the user terminal is installed in the movable body by causing the movable body to drop in at the through-point.

6 Claims, 6 Drawing Sheets

(56) References Cited

U.S. PATENT DOCUMENTS

| | | | | |
|---|---|---|---|---|
| 2004/0140683 A1* | 7/2004 | Orischak | .................. | B60P 3/14 |
| | | | | 296/24.32 |
| 2008/0129818 A1* | 6/2008 | Miller | .................. | G06T 19/003 |
| | | | | 348/E7.001 |
| 2009/0198381 A1* | 8/2009 | Friedman | ............. | G05D 1/0274 |
| | | | | 901/50 |
| 2010/0010673 A1* | 1/2010 | Wang | .................... | G16H 40/67 |
| | | | | 901/1 |
| 2010/0240988 A1* | 9/2010 | Varga | ..................... | G06F 3/011 |
| | | | | 600/425 |
| 2011/0301760 A1* | 12/2011 | Shuster | .................. | G06F 16/00 |
| | | | | 700/264 |
| 2012/0050144 A1* | 3/2012 | Morlock | ............... | G06T 19/006 |
| | | | | 345/8 |
| 2012/0320080 A1* | 12/2012 | Giese | ..................... | G06F 3/011 |
| | | | | 345/619 |
| 2013/0066468 A1* | 3/2013 | Choi | ...................... | B25J 11/008 |
| | | | | 901/1 |
| 2014/0313203 A1* | 10/2014 | Shugart | ................. | G06T 19/003 |
| | | | | 345/427 |
| 2016/0148433 A1* | 5/2016 | Petrovskaya | ......... | G06T 19/006 |
| | | | | 345/633 |
| 2018/0217598 A1 | 8/2018 | Kuhara | | |
| 2021/0248674 A1* | 8/2021 | Ogunbunmi | ............ | G06F 3/011 |

\* cited by examiner

FIG. 4

| USER ID | DESTINATION | REQUESTED DATE AND TIME | MODEL HOME ID | OPTION ID | | |
|---|---|---|---|---|---|---|
| U101 | X1 | Y1 | A001 | B001 | B004 | ... |
| U102 | X2 | Y2 | A002 | B002 | B005 | ... |
| U103 | X3 | Y3 | A003 | B003 | B006 | ... |
| ... | ... | ... | ... | ... | ... | ... |

FIG. 5

| VEHICLE ID | POSITIONAL INFORMATION | OPERATING STATUS | MODEL HOME ID | OPTION ID | | |
|---|---|---|---|---|---|---|
| | | | | #1 | #2 | ... |
| E01 | F01 | STANDBY | A001 | B001 | B004 | ... |
| E02 | F02 | STANDBY | A002 | B002 | B005 | ... |
| E03 | F03 | STANDBY | A003 | B003 | B006 | ... |
| ... | ... | ... | ... | ... | ... | ... |

FIG. 6

| OPTION ID | THROUGH-POINT | | |
|---|---|---|---|
| | #1 | #2 | ... |
| B001 | L001 | L005 | ... |
| B002 | L002 | ... | ... |
| B003 | L003 | ... | ... |
| B004 | L004 | ... | ... |
| ... | ... | ... | ... |

INFORMATION PROCESSING DEVICE TO GENERATE A NAVIGATION COMMAND FOR A VEHICLE

INCORPORATION BY REFERENCE

The disclosure of Japanese Patent Application No. 2019-013344 filed on Jan. 29, 2019 including the specification, drawings and abstract is incorporated herein by reference in its entirety.

BACKGROUND

1. Technical Field

The present disclosure relates to an information processing device, an information processing method, and a program.

2. Description of Related Art

There has been known a system that checks whether or not a package is delivered by a movable body that autonomously travels, when a delivery mode to deliver the package by the movable body that autonomously travels is designated (for example, see Japanese Unexamined Patent Application Publication No. 2018-124676 (JP 2018-124676 A)).

SUMMARY

JP 2018-124676 A describes a movable body that performs delivery of a package but does not describe anything about other movable bodies. An object of the present disclosure is to allow a user to observe a movable body in a state requested by the user.

One aspect of the present disclosure is to provide an information processing device including a controlling portion. The controlling portion is configured to execute: acquisition of information about a through-point corresponding to a selection object selected by a user terminal from among selection objects installable in a movable body in a base state; acquisition of information about a destination output from the user terminal as a point where a user observes the movable body in a state where the selection object selected by the user terminal is installed; and generation of a navigation command so as to move the movable body to the destination after the selection object selected by the user terminal is installed in the movable body by causing the movable body to drop in at the through-point.

One aspect of the present disclosure is to provide an information processing method including: acquiring, by a computer, information about a through-point corresponding to a selection object selected by a user terminal from among selection objects installable in a movable body in a base state; acquiring, by the computer, information about a destination output from the user terminal as a point where a user observes the movable body in a state where the selection object selected by the user terminal is installed; and generating, by the computer, a navigation command so as to move the movable body to the destination after the selection object selected by the user terminal is installed in the movable body by causing the movable body to drop in at the through-point.

One aspect of the present disclosure is to provide a program causing a computer to execute: acquisition of information about a through-point corresponding to a selection object selected by a user terminal from among selection objects installable in a movable body in a base state; acquisition of information about a destination output from the user terminal as a point where a user observes the movable body in a state where the selection object selected by the user terminal is installed; and generation of a navigation command so as to move the movable body to the destination after the selection object selected by the user terminal is installed in the movable body by causing the movable body to drop in at the through-point.

With the present disclosure, the user can observe the movable body in a state requested by the user.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 4 is a view illustrating a table configuration of user information;

FIG. 5 is a view illustrating a table configuration of vehicle information;

FIG. 6 is a view illustrating a table configuration of information on a through-point corresponding to an option ID;

DETAILED DESCRIPTION OF EMBODIMENTS

Figure 1:
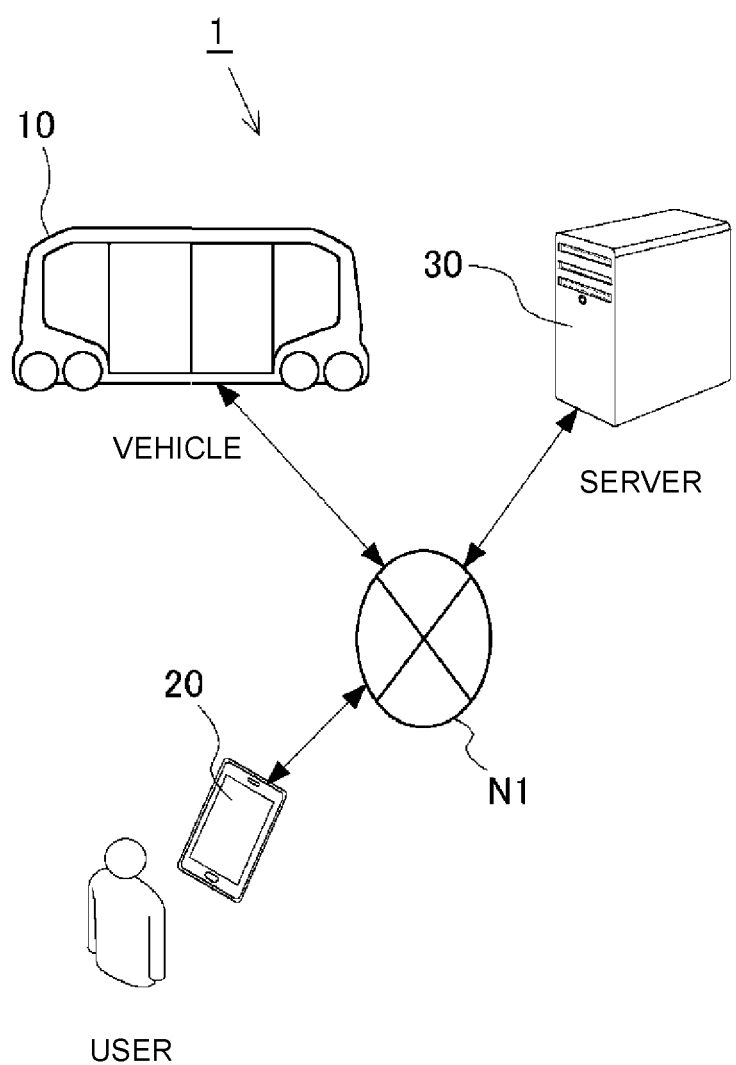
FIG. 1 is a view illustrating a schematic configuration of an automatic driving system according to an embodiment.

In accordance with a navigation command generated by an information processing device that is one aspect of the present disclosure, a movable body (e.g., a vehicle) moves. The navigation command is generated so that the movable body drops in at a through-point corresponding to a selection object selected by a user. When the movable body moves in accordance with the navigation command, the selection object can be installed in the movable body in a base state. Note that the base state indicates a state where no selection object is installed in the movable body. At a destination, the user can observe the movable body in a state where the movable body is equipped with the selection object. When the user does not select any selection object, the user can observe the movable body in the base state.

A controlling portion acquires information about the selection object output from a user terminal. The selection object output from the user terminal is a selection object selected by the user and a selection object to be installed in the movable body in the base state in response to a request from the user. Further, the controlling portion acquires information about a destination. The destination is a point where the user observes the movable body in a state where the selection object is installed in the movable body and is, for example, a location of the user. Further, the controlling portion acquires information about a through-point corresponding to the selection object output from the user terminal. In a case where there is a plurality of through-points, the controlling portion acquires respective pieces of information about the through-points. The information about the through-point corresponding to the selection object is information about a point at which the movable body drops in so as to be equipped with the selection object, for example. This point is a point where a factory or the like to install the selection object in the movable body is present, for example. The controlling portion generates a navigation command for the movable body so that the movable body moves to the destination via the through-point. The navigation command is generated by a server or the movable body, for example. The navigation command may include information about a movement route of the movable body. When the movable body moves in accordance with the navigation command, the selection object can be installed in the movable body.

When the vehicle body drops in at the through-point as such, the selection object selected by the user can be installed in the movable body. Accordingly, the user can observe the movable body equipped with the selection object selected by the user at the destination. Since the movable body moves to the destination by autonomous traveling, the user does not need to move, so that the user can save time.

In a case where the user terminal outputs a plurality of selection objects, the controlling portion may execute the generation of the navigation command so that the movable body drops in at their corresponding through-points in accordance with the installation order of the selection objects to be installed in the movable body.

When the selection objects are installed in the movable body, the installation order of the selection objects may be determined in some cases. In such cases, the movable body is moved in accordance with this order, so that the selection objects can be installed in the movable body in accordance with the order.

Further, the controlling portion may execute selection of the movable body in a base state based on information output from the user terminal.

In a case where there are movable bodies in different base states, a movable body in a base state requested by the user is selected based on the information output from the user terminal. Accordingly, the user can select a movable body in a base state that matches the preference of the user from among the movable bodies in different base states. Hereby, a selection object can be installed in the movable body in a base state that matches the need of the user.

The following describes embodiments with reference to the drawings. Configurations of the following embodiments are examples, and the disclosure is not limited to the configurations of the embodiments. Further, the following embodiments can be combined appropriately when possible.

Embodiments

Outline of Automatic Driving System

FIG. 1 is a view illustrating a schematic configuration of an automatic driving system 1 according to an embodiment. The automatic driving system 1 includes a vehicle 10, a user terminal 20, and a server 30, for example. The vehicle 10 is one example of a movable body. A model home for a house is formed in the vehicle 10. The automatic driving system 1 illustrated in FIG. 1 is a system in which the vehicle 10 as the model home for the house moves to a destination (e.g., a location of a user), so that the user can observe the model home. When the user selects an option (a selection object) for the house via the user terminal 20, the vehicle 10 drops in at a through-point so as to be equipped with the option, and then, the vehicle 10 moves to the destination. Then, the user observes the model home equipped with the option at the destination. In order to be equipped with the option, the vehicle 10 drops in at a factory or the like where the option is installable in the vehicle 10. The server 30 generates a navigation command for the vehicle 10 based on a through-point corresponding to the option selected by the user. The navigation command is generated so that the vehicle 10 leaves a current location, the option is installed in the vehicle 10 at the through-point, and then, the vehicle 10 travels to the destination, for example. The navigation command thus generated is transmitted to the vehicle 10 from the server 30. The vehicle 10 that has received the navigation command autonomously travels in accordance with the navigation command.

The inside or outside of the vehicle 10 is formed in imitation of the inside or outside of a house that a house distributor sells so that the user can check the layout, facility, structure, decoration, quality, convenience, and the like of the house. Note that the number of vehicles 10 is not limited to one as illustrated in FIG. 1 and may be two or more. For example, a plurality of vehicles 10 corresponding to a plurality of different houses may be included. A model home in a base state in which no option is installed is formed in the vehicle 10. Further, the vehicle 10 is configured such that an option requested by the user is installable.

The user in FIG. 1 is a user who operates the user terminal 20 and is a user who requests the server 30 to allow the user to observe the model home. The user is also a user who selects an option for the model home. A plurality of users can be present, and the number of user terminals 20 corresponds to the number of users. The user terminal 20 outputs information about a model home requested by the user, information about an option selected by the user, and information about a destination that is a point where the user observes the model home. Note that the destination is, for example, a location input by the user via the user terminal 20, a location registered in the server 30 in advance by the user, or a current location of the user terminal 20.

The server 30 acquires those pieces of information output from the user terminal 20, i.e., the information about the model home, the information about the option, and the information about the destination. The server 30 selects a vehicle 10 corresponding to the model home that the user requests to observe (selects a movable body in a base state).

The vehicle 10, the user terminal 20, and the server 30 are connected mutually via a network N1. The network N1 is a global public communication network such as the Internet, for example, and a wide area network (WAN) or other communication networks may be employed. Further, the network N1 may include a telecommunications network such as a mobile phone and a wireless communication network such as WiFi.

Hardware Configuration

Figure 2:
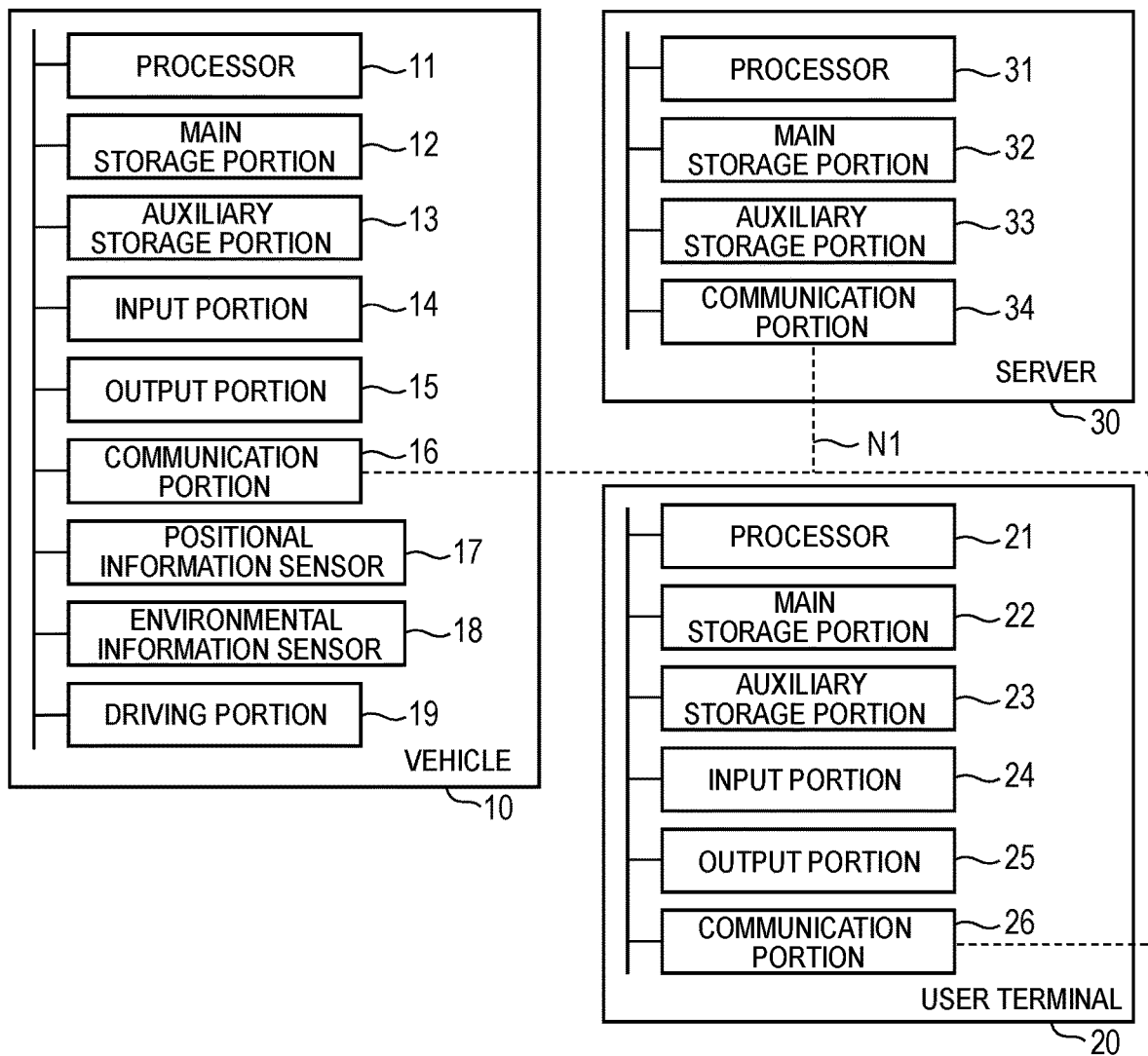
FIG. 2 is a block diagram diagrammatically illustrating examples of respective configurations of a vehicle, a user terminal, and a server constituting the automatic driving system according to the embodiment.

Hardware configurations of the vehicle 10, the user terminal 20, and the server 30 will be described with reference to FIG. 2. FIG. 2 is a block diagram diagrammatically illustrating examples of respective configurations of the vehicle 10, the user terminal 20, and the server 30 constituting the automatic driving system 1 according to the present embodiment.

The server 30 has a configuration of a general computer. The server 30 includes a processor 31, a main storage portion 32, an auxiliary storage portion 33, and a communication portion 34. These portions are connected mutually via buses.

The processor 31 may be a central processing unit (CPU), a digital signal processor (DSP), or the like. The processor 31 controls the server 30 and performs computing of various information processing. The processor 31 is one example of "controlling portion." The main storage portion 32 is a random access memory (RAM), a read only memory (ROM), or the like. The auxiliary storage portion 33 is an erasable programmable ROM (EPROM), a hard disk drive (HDD), a removable medium, or the like. An operating system (OS), various programs, various tables, and the like are stored in the auxiliary storage portion 33. The processor 31 loads a program stored in the auxiliary storage portion 33 into a working area of the main storage portion 32 and executes the program, so that each constituent part or the like is controlled through the execution of the program. Hereby, the server 30 implements a function corresponding to a predetermined purpose. The main storage portion 32 and the auxiliary storage portion 33 are recording media readable by a computer or the like. Note that the server 30 may be a single computer or may be configured such that several computers cooperate with each other. Further, information stored in the auxiliary storage portion 33 may be stored in the main storage portion 32. Further, information stored in the main storage portion 32 may be stored in the auxiliary storage portion 33.

The communication portion 34 is a unit that communicates with the vehicle 10 and the user terminal 20 via the network N1. The communication portion 34 is, for example, a local area network (LAN) interface board or a radio communications circuit for wireless communication. The LAN interface board or the radio communications circuit is connected to the network N1.

Note that a series of processes executed by the server 30 can be executed by hardware or can be also executed by software. The hardware configuration of the server 30 is not limited to the configuration illustrated in FIG. 2. Further, some of or all of the constituents of the server 30 may be provided in the vehicle 10.

Next will be described the vehicle 10. The vehicle 10 includes a processor 11, a main storage portion 12, an auxiliary storage portion 13, an input portion 14, an output portion 15, a communication portion 16, a positional information sensor 17, an environmental information sensor 18, and a driving portion 19. These portions are connected mutually via buses. The processor 11, the main storage portion 12, and the auxiliary storage portion 13 are configured similarly to the processor 31, the main storage portion 32, and the auxiliary storage portion 33 of the server 30, so that their descriptions will be omitted herein.

The input portion 14 is a unit that receives an input operation performed by the user and is, for example, a touch panel, a push button, or the like. The output portion 15 is a unit that provides information to the user and is, for example, a liquid crystal display (LCD), an electroluminescence (EL) panel, a speaker, a lamp, or the like. The input portion 14 and the output portion 15 may be configured as one touch panel display. The input portion 14 and the output portion 15 can be used by a user who uses the vehicle 10 or a user who manages the vehicle 10, for example. The communication portion 16 is a communication unit that connects the vehicle 10 to the network N1. The communication portion 16 is, for example, a circuit that performs communication with other devices (e.g., the server 30 or the like) via the network N1 by use of a mobile communication service (a telecommunications network such as the 3rd generation (3G) or the long term evolution (LTE) or a wireless communication such as WiFi).

The positional information sensor 17 acquires positional information (e.g., latitude and longitude) of the vehicle 10 at a predetermined cycle. The positional information sensor 17 is, for example, a global positioning system (GPS) receiving portion, a WiFi communication portion, or the like. The information acquired by the positional information sensor 17 is stored in the auxiliary storage portion 13 or the like and transmitted to the server 30, for example.

The environmental information sensor 18 is a unit that senses a state of the vehicle 10 and senses a region around the vehicle 10. The sensor that senses the state of the vehicle 10 includes an acceleration sensor, a vehicle speed sensor, an azimuth angle sensor, and the like. The sensor that senses the region around the vehicle 10 includes a stereoscopic camera, a laser scanner, LIDAR, a radar, and the like.

The driving portion 19 causes the vehicle 10 to travel based on a control command generated by the processor 11. The driving portion 19 includes a motor and an inverter for driving wheels provided in the vehicle 10, a brake, a steering mechanism, and the like, for example. When the motor, the brake, and the like are driven in accordance with the control command, the autonomous traveling of the vehicle 10 is achieved.

Next will be described the user terminal 20. The user terminal 20 is a small computer such as a smartphone, a mobile phone, a tablet terminal, a personal information terminal, a wearable computer (a smart watch or the like), or a personal computer (PC). The user terminal 20 includes a processor 21, a main storage portion 22, an auxiliary storage portion 23, an input portion 24, an output portion 25, and a communication portion 26. These portions are connected mutually via buses. Since the processor 21, the main storage portion 22, the auxiliary storage portion 23, the input portion 24, the output portion 25, and the communication portion 26 are configured similarly to the processor 11, the main storage portion 12, the auxiliary storage portion 13, the input portion 14, the output portion 15, and the communication portion 16 of the vehicle 10, descriptions thereof are omitted. Note that the user terminal 20 may be a single computer or may be configured such that several computers cooperate with each other. Further, some of the constituents of the user terminal 20 may be provided in the vehicle 10.

Functional Configuration: Server

Figure 3:
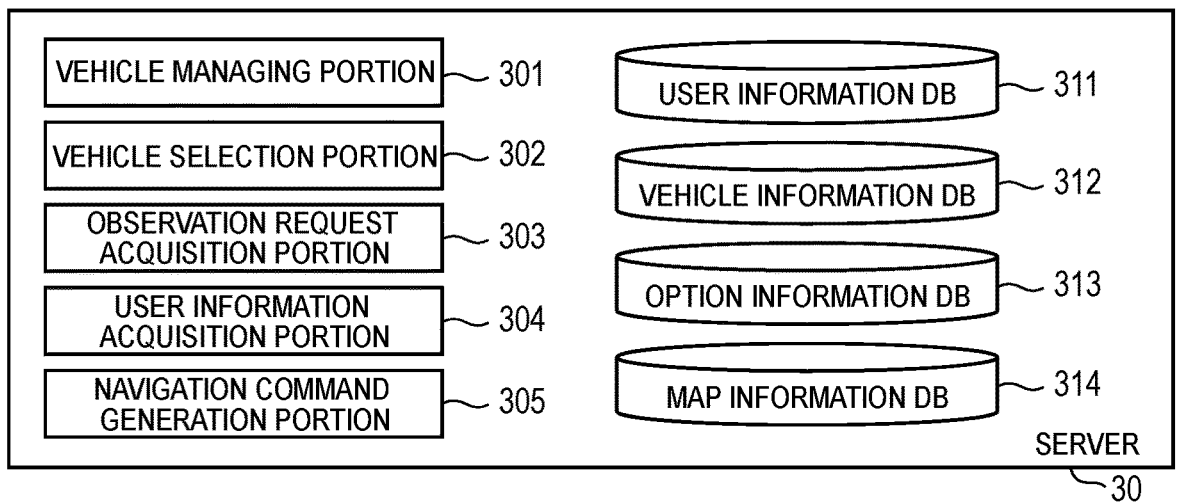
FIG. 3 is a view illustrating one example of a functional configuration of the server.

FIG. 3 is a view illustrating one example of a functional configuration of the server 30. The server 30 may include, as functional constituents, a vehicle managing portion 301, a vehicle selection portion 302, an observation request acquisition portion 303, a user information acquisition portion 304, a navigation command generation portion 305, a user information DB 311, a vehicle information DB 312, an option information DB 313, and a map information DB 314. The vehicle managing portion 301, the vehicle selection portion 302, the observation request acquisition portion 303, the user information acquisition portion 304, and the navigation command generation portion 305 are functional constituents provided when the processor 31 of the server 30 executes various programs stored in the auxiliary storage portion 33, for example.

The user information DB 311, the vehicle information DB 312, the option information DB 313, and the map information DB 314 are relational databases established such that a program of a database management system (DBMS) to be executed by the processor 31 manages data to be stored in the auxiliary storage portion 33. Note that any of the functional constituents of the server 30 or some of processes thereof may be executed by other computers connected to the network N1.

The vehicle managing portion 301 manages various pieces of information about the vehicle 10. The vehicle managing portion 301 acquires and manages positional information transmitted from the vehicle 10 at a predetermined cycle or positional information transmitted from the vehicle 10 in accordance with a request from the server 30, for example. The vehicle managing portion 301 stores positional information and a vehicle ID in the vehicle information DB 312 in association with each other. Further, the vehicle managing portion 301 manages an operating status of the vehicle 10. The operating status is information based on which it is determined whether the vehicle 10 is in an operated state that allows an observation of a model home or the vehicle 10 is in a standby state. The vehicle managing portion 301 stores the operating status and the vehicle ID in the vehicle information DB 312 in association with each other. The operating status may be transmitted from the vehicle 10 at a predetermined cycle, for example. Further, the vehicle managing portion 301 may determine the operating status based on the positional information of the vehicle 10. For example, when a current location of the vehicle 10 is a home base of the vehicle 10, it may be determined that the vehicle 10 is in a standby state, and when the current location of the vehicle 10 is a place other than the home base of the vehicle 10, it may be determined that the vehicle 10 is in an operated state. Further, the vehicle managing portion 301 manages information about a model home and an option that are applicable to the vehicle 10, for example. The information about the model home and the option that are applicable to the vehicle 10 is information acquired in advance per vehicle 10 via the input portion 14 of the vehicle 10, a terminal connected to the server 30, a terminal connected to the network N1, or the like. The vehicle managing portion 301 stores a model home and an option that are applicable to each vehicle 10 in the vehicle information DB 312 in association with the vehicle ID.

The vehicle selection portion 302 selects a vehicle 10 to be observed by the user, based on the output from the user terminal 20, for example. For example, the vehicle selection portion 302 selects a vehicle 10 corresponding to a model home and an option requested by the user and entering a standby state as the vehicle 10 to be observed by the user.

The observation request acquisition portion 303 acquires an observation request output from the user terminal 20, for example. The observation request is information to request the observation of the vehicle 10 as a model home. The observation request is output from the user terminal 20 together with a model home ID and an option ID. The model home ID is an identifier inherent to the model home. The option ID is an identifier inherent to the option. The observation request is generated by the user terminal 20 when the user performs a predetermined input into the input portion 24 of the user terminal 20. The observation request includes information about a user ID associated with the user. The user ID is an identifier inherent to the user. The observation request acquisition portion 303 stores the model home ID and the option ID thus acquired in the user information DB 311 (described later). Note that, in a case where there is only one model home, the model home ID can be omitted.

The user information acquisition portion 304 acquires user information of the user who requests the observation of the model home. The user information is information output from the user terminal 20 together with the observation request and is information about a location (a destination of the vehicle 10) where the user requests the observation of the model home and about the date and time when the user requests the observation of the model home. When the user information acquisition portion 304 acquires the user information, the user information acquisition portion 304 stores the user information in the user information DB 311.

The navigation command generation portion 305 generates a navigation command so that the vehicle 10 reaches the location (destination) requested by the user after the vehicle 10 is equipped with an option by dropping in at a through-point as a location of a factory where the option is installable in the vehicle 10, for example. In a case where a plurality of options is selected, the navigation command is generated so that the vehicle 10 drops in at their corresponding through-points in accordance with the installation order of the options. The installation order of the options is associated with their option IDs. Note that the navigation command generation portion 305 according to the present embodiment generates a movement route based on map information stored by in the map information DB 314 (described later). The movement route is generated as a route that follows a predetermined rule, e.g., a route where the moving distance of the vehicle 10 is shortest, a route where the moving time of the vehicle 10 is shortest, or the like. The navigation command generation portion 305 transmits, to the vehicle 10, the navigation command including the movement route.

The user information DB 311 is formed such that user information is stored in the auxiliary storage portion 33. Here, a configuration of the user information to be stored in the user information DB 311 will be described with reference to FIG. 4. FIG. 4 is a view illustrating a table configuration of the user information. The user information table has a user ID field, a destination field, a requested date and time field, a model home ID field, and an option ID field. Information to specify a user is stored in the user ID field. In the user ID, a full name, an address, and the like of the user are associated with each other. Information indicative of a location (destination) where the user requests the observation of the model home is input in the destination field. Information indicative of the date and time when the user requests the observation of the model home is input in the requested date and time field. The destination and the requested date and time may be input by the user via the input portion 24 of the user terminal 20 when the observation request is generated, or the destination and the requested date and time may be registered in advance in the user terminal 20 or the server 30 before the observation request is generated. Information indicative of a model home ID of a model home requested by the user is input into the model home ID field. Information indicative of an option ID of an option requested by the user is input in the option ID field. Note that, in a case where the vehicle 10 starts moving immediately when the user requests the observation of the model home or in a case where the date and time for the movement of the vehicle 10 are determined in advance, the requested date and time field can be omitted.

The vehicle information DB 312 is formed such that vehicle information is stored in the auxiliary storage portion 33, and the vehicle ID is associated with the vehicle information in the vehicle information DB 312. Here, a configuration of the vehicle information to be stored in the vehicle information DB 312 will be described with reference to FIG. 5. FIG. 5 is a view illustrating a table configuration of the vehicle information. The vehicle information table has a vehicle ID field, a positional information field, an operating status field, a model home ID field, and an option ID field. Identification information to specify the vehicle 10 is stored in the vehicle ID field. Positional information transmitted from the vehicle 10 is input in the positional information field. The positional information is information indicative of the current location of the vehicle 10. Information indicative of whether the vehicle 10 is operating to allow the user to observe the model home or the vehicle 10 stands by is input in the operating status field. The operating status may be transmitted from the vehicle 10, for example. Information indicative of a model home ID of a model home corresponding to the vehicle 10 is input into the model home ID field. Information indicative of an option ID of an option to be applied to the vehicle 10 is input into the option ID field. Further, the installation order of the option is associated with the option ID to be input into the option ID field. That is, in a case where a plurality of options is selected by the user, the option ID field is generated so that the options are to be installed in order of an option ID #1, an option ID #2, and so on.

The option information DB 313 is formed such that information about a through-point for the vehicle 10 that corresponds to an option ID is stored in the auxiliary storage portion 33. Here, a configuration of the information about the through-point to be stored in the option information DB 313 will be described with reference to FIG. 6. FIG. 6 is a view illustrating a table configuration of the information about the through-point corresponding to the option ID. The option information table has an option ID field and a through-point field. Information to specify an option is stored in the option ID field. Information about a through-point that is a location of a factory or the like where an option is installed and corresponds to the option is input in the through-point field. Note that, in a case where operations at a plurality of factories are required for one option, pieces of information about their corresponding through-points are input. In this case, the installation order of the option is associated with the through-points to be input into the through-point field. That is, in a case where an option should correspond to a plurality of factories, the through-point field is generated so that the option is installed by sequentially dropping in at a through-point #1, a through-point #2, and so on in this order.

In the map information DB 314, map information including map data and point-of-interest (POI) information on a letter, a picture, or the like indicative of a characteristic of each point on the map data are stored. Note that the map information DB 314 may be provided by other systems connected to the network N1, e.g., a geographic information system (GIS).

Functional Configuration: Vehicle

Figure 7:
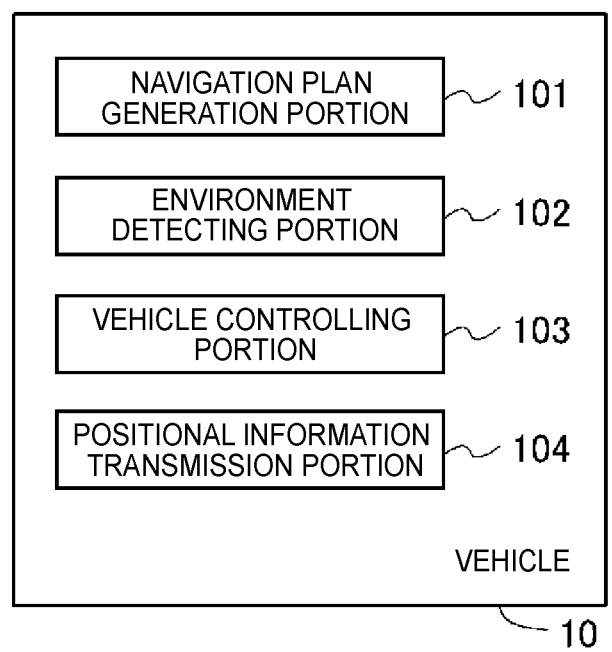
FIG. 7 is a view illustrating one example of a functional configuration of the vehicle.

FIG. 7 is a view illustrating one example of a functional configuration of the vehicle 10. The vehicle 10 includes, as functional constituents, a navigation plan generation portion 101, an environment detecting portion 102, a vehicle controlling portion 103, and a positional information transmission portion 104. The navigation plan generation portion 101, the environment detecting portion 102, the vehicle controlling portion 103, and the positional information transmission portion 104 are functional constituents provided when the processor 11 of the vehicle 10 executes various programs stored in the auxiliary storage portion 13, for example.

The navigation plan generation portion 101 acquires a navigation command from the server 30 and generates a navigation plan for the vehicle 10. The navigation plan generation portion 101 calculates a movement route for the vehicle 10 based on the navigation command given from the server 30 and generates a navigation plan to move along the movement route.

The environment detecting portion 102 detects the environment around the vehicle 10 that is necessary for autonomous traveling, based on data acquired by the environmental information sensor 18. Detection targets are, for example, the number of lanes and positions thereof, the number of other movable bodies present around the vehicle 10 and positions thereof, the number of obstacles (e.g., a pedestrian, a bicycle, a structural object, a building, and the like) present around the vehicle 10 and positions thereof, the structure of a road, a road sign, and the like, but the detection targets are not limited to them. The detection target may be any object provided that the object is necessary to be detected for autonomous traveling. For example, in a case where the environmental information sensor 18 is a stereoscopic camera, object detection around the vehicle 10 is performed by image-processing on image data captured by the stereoscopic camera. Data (hereinafter referred to as environment data) about the environment around the vehicle 10 that is detected by the environment detecting portion 102 is transmitted to the vehicle controlling portion 103 (described later).

The vehicle controlling portion 103 generates a control command to control the autonomous traveling of the vehicle 10 based on the navigation plan generated by the navigation plan generation portion 101, the environment data generated by the environment detecting portion 102, and the positional information of the vehicle 10 that is acquired by the positional information sensor 17. For example, the vehicle controlling portion 103 generates the control command so that the vehicle 10 travels along a predetermined route and no obstacle enters a predetermined safety area around the vehicle 10. The control command thus generated is transmitted to the driving portion 19. As a generation method of the control command to autonomously move the vehicle 10, a well-known method can be employed.

The positional information transmission portion 104 transmits positional information acquired from the positional information sensor 17 to the server 30 via the communication portion 16. A timing when the positional information transmission portion 104 transmits the positional information can be set appropriately. For example, the positional information transmission portion 104 may transmit the positional information regularly, the positional information transmission portion 104 may transmit the positional information at a timing when some information is transmitted to the server 30, or the positional information transmission portion 104 may transmit the positional information in response to a request from the server 30. The positional information transmission portion 104 transmits the positional information to the server 30 together with identification information (a vehicle ID) that uniquely identifies the vehicle 10. Note that the vehicle ID that identifies the vehicle 10 is assigned in advance.

Functional Configuration: User Terminal

Figure 8:
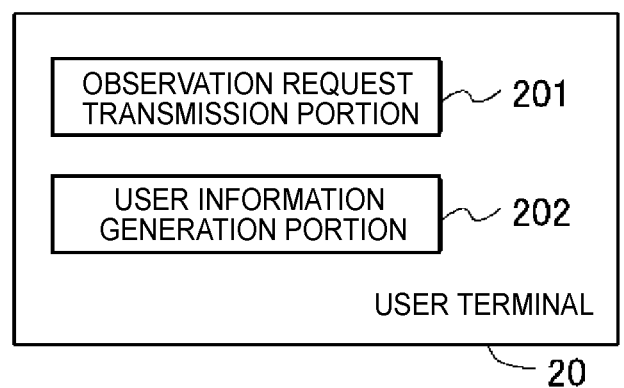
FIG. 8 is a view illustrating one example of a functional configuration of the user terminal.

FIG. 8 is a view illustrating one example of a functional configuration of the user terminal 20. The user terminal 20 includes, as functional constituents, an observation request transmission portion 201 and a user information generation portion 202. The observation request transmission portion 201 and the user information generation portion 202 are functional constituents provided when the processor 21 of the user terminal 20 executes various programs stored in the auxiliary storage portion 23, for example.

The observation request transmission portion 201 generates an observation request corresponding to the input by the user into the input portion 24. For example, the observation request transmission portion 201 displays in a selectable manner, on a touch panel display of the user terminal 20, a list of model homes and a list of options corresponding to each of the model homes. When the user clicks a desired model home and a desired option from the list of model homes and the list of options displayed on the touch panel display, the observation request transmission portion 201 generates an observation request. The observation request transmission portion 201 associates the observation request thus generated with the user ID and outputs the observation request together with the model home ID, the option ID, and the user information.

Note that the option ID may be output from the user terminal 20 after the observation request is output. For example, when the server 30 receives the observation request, the observation request acquisition portion 303 acquires option IDs corresponding to the model home ID from the vehicle information DB 312. Then, the server 30 transmits the option IDs to the user terminal 20 and causes the output portion 25 of the user terminal 20 to output selectable options. The option ID of an option input by the user via the input portion 24 is output from the user terminal 20.

The user information generation portion 202 generates user information (information about the destination and the date and time). The user information generation portion 202 displays, on the output portion 25, an operation screen to promote input of user information and generates the user information corresponding to the input by the user into the input portion 24. The user information thus generated is transmitted to the server 30 together with the observation request by the observation request transmission portion 201. Note that the user may input the user information via the input portion 24 in advance, and the user information may be stored in the auxiliary storage portion 23 of the user terminal 20. Further, the user information generation portion 202 may generate user information based on data stored in the auxiliary storage portion 23. Further, in a case where the user terminal 20 includes a global positioning system (GPS), a position of the user terminal 20 may be detected by receiving a radio wave transmitted from an artificial satellite at the time when the user information is generated, and the user information generation portion 202 may set the position of the user terminal 20 as the destination.

Procedure of Process: Server

Figure 9:
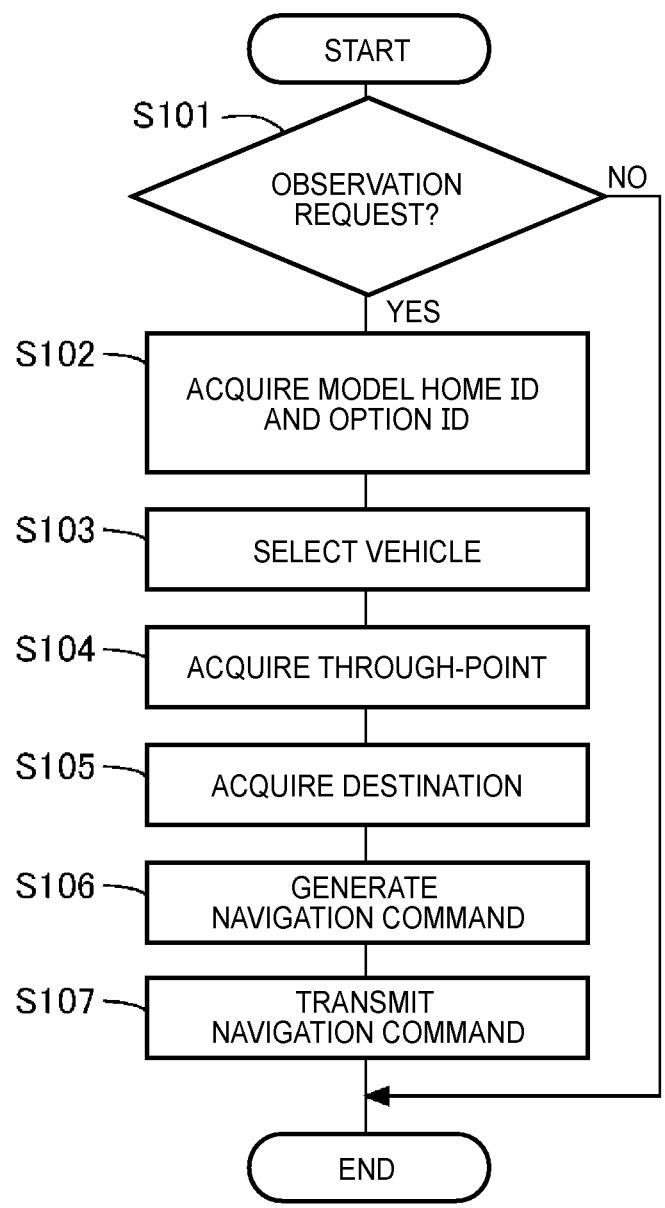
FIG. 9 is an exemplary flowchart of a process of transmitting a navigation command according to the embodiment.

Next will be described a process of transmitting the navigation command from the server 30 to the vehicle 10. FIG. 9 is an exemplary flowchart of a process of transmitting the navigation command according to the present embodiment. The process illustrated in FIG. 9 is executed by the processor 31 of the server 30 at predetermined time intervals. Note that, herein, the server 30 shall have already received information necessary to build the user information DB 311, the vehicle information DB 312, and the option information DB 313 from the vehicle 10 and the user terminal 20. Further, the vehicle 10 shall stand by in a base state in which the vehicle 10 is not equipped with any option.

In step S101, the observation request acquisition portion 303 determines whether the server 30 has received an observation request from the user terminal 20 or not. When a positive determination is made in step S101, the process advances to step S102, and when a negative determination is made, this routine is terminated.

In step S102, the vehicle selection portion 302 acquires a model home ID of a model home and option IDs that are requested by the user, by accessing the user information DB 311. Subsequently, in step S103, the vehicle selection portion 302 selects a vehicle 10 corresponding to the model home and options requested by the user for the observation. The vehicle selection portion 302 accesses the vehicle information DB 312 and selects a vehicle 10 which corresponds to the model home ID and the option IDs thus acquired and the operating status of which is "standby." Note that, in a case where there is no vehicle 10 in a standby state, the vehicle selection portion 302 may output information to inform the user that there is no vehicle 10 in a standby state and terminate the routine.

In step S104, the navigation command generation portion 305 acquires through-points corresponding to the option IDs. The navigation command generation portion 305 accesses the option ID DB 313 and acquires the through-points corresponding to the option IDs. Subsequently, in step S105, the navigation command generation portion 305 acquires a destination corresponding to the user ID. The navigation command generation portion 305 accesses the user information DB 311 and acquires the destination corresponding to the user ID.

In step S106, the navigation command generation portion 305 generates a navigation command for the vehicle 10. The navigation command generation portion 305 acquires user information from the user information DB 311 and acquires an option installation order from the vehicle information DB 312 and the option information DB 313. The navigation command generation portion 305 generates the navigation command so that the vehicle 10 moves to the destination on the requested date and time after the vehicle 10 drops in at the through-points in the option installation order so as to install the options in the vehicle 10.

Then, in step S107, the navigation command generation portion 305 transmits the navigation command to the vehicle 10 selected in step S102. At this time, the navigation command generation portion 305 may access the vehicle information DB 312 and update the operating status of the selected vehicle 10 to "under operation."

Note that the server 30 may notify the user terminal 20 of the current location of the vehicle 10. This notification may be performed in response to a user request or may be performed at predetermined time intervals.

Procedure of Process: Vehicle

Figure 10:
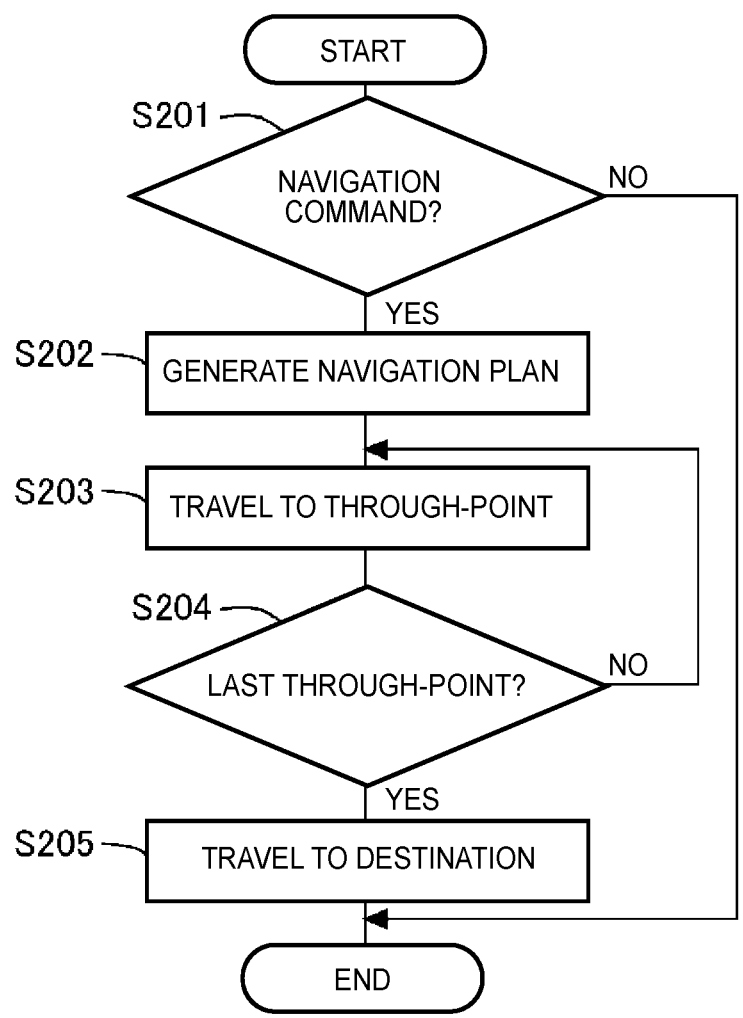
FIG. 10 is an exemplary flowchart of a process of causing the vehicle to travel according to the embodiment.

Next will be described a process of causing the vehicle 10 to travel. FIG. 10 is an exemplary flowchart of the process of causing the vehicle 10 to travel according to the present embodiment. The process illustrated in FIG. 10 is executed by the processor 11 of the vehicle 10 at predetermined time intervals. Note that this flowchart is executed for the vehicle 10 in a standby state.

In step S201, the navigation plan generation portion 101 determines whether the user terminal 20 has received the navigation command from the server 30 or not. When a positive determination is made in step S201, the process advances to step S202, and when a negative determination is made, this routine is terminated. In step S202, the navigation plan generation portion 101 generates a navigation plan in accordance with the navigation command.

In step S203, the vehicle controlling portion 103 generates the control command, so that the driving portion 19 is controlled in accordance with the control command, and the vehicle 10 travels to the through-points. Then, the options are installed in the vehicle 10 at the through-points. Note that the option installation may be performed by an operator or may be performed by an automated machine. The option installation may not be performed in a factory. Further, the options may be received from other vehicles 10. In this case, the vehicles 10 may have facilities for automatically changing the options between the vehicles 10.

Subsequently, in step S204, the vehicle controlling portion 103 determines whether the current location of the vehicle 10 is a last through-point or not. When a positive determination is made in step S204, the process advances to step S205, and when a negative determination is made, the process returns to step S203 so that the vehicle 10 travels to a next through-point. In step S205, the vehicle controlling portion 103 causes the vehicle 10 to travel to the destination (the location of the user), and after that, the vehicle controlling portion 103 terminates this routine.

As discussed above, in the present embodiment, the user can observe a model home by use of the vehicle 10 that autonomously travels. This makes it possible for the user to save trouble to move to the model home. Further, the vehicle 10 can autonomously travel in order that an option requested by the user is installed in the vehicle 10. Since the user can observe the model home in a state where the requested option is installed, the user can observe the model home in a state closer to an actual state. Here, in a conventional model home, the model home might not be equipped with an option requested by the user, or the model home might be equipped with an option that is not requested by the user in some cases. Accordingly, even if the user observes the model home, it is difficult to grasp what an actual house will be like. In the meantime, in the vehicle 10 according to the present embodiment, the user can observe the model home in a state where the option requested by the user is installed, so that the user can easily grasp what an actual house will be like. Further, if the vehicle 10 stands by in a state where the vehicle 10 is equipped with the option, it is possible to decrease the area of a warehouse or the like in which the option is to be stored.

Other Embodiments

The above embodiment is just one example, and the present disclosure can be carried out with various modifications appropriately within a range that does not deviate from the gist of the present disclosure.

The above embodiment deals with a case where the user observes the vehicle 10 as a model home. However, the present disclosure is not limited to this, and the present disclosure is applicable to a case where the user observes the vehicle 10 equipped with a product or the like having options selectable by the user. Further, in the above embodiment, the vehicle 10 moves to the destination after all options are installed in the vehicle 10. However, instead of this, every time an option is installed in the vehicle 10, the vehicle 10 may drop in at the destination so that the user can observe the vehicle 10. Hereby, the user can observe each state of the vehicle 10 in the course of installing the options. Further, in order to install the option selected by the user, it is necessary to remove a device or the like that has been already installed in the vehicle 10. In a case where this operation is performed in a factory different from a factory where the option is installed, the navigation command may be generated so that the vehicle 10 drops in at all these factories.

The processes and the means described in this disclosure can be combined freely as long as no technical inconsistency occurs.

Further, a process described as a process to be executed by one device may be divided and executed by a plurality of devices. Further, a process described as a process to be executed by different devices may be executed by one device. In a computer system, which hardware configuration (server configuration) is employed to implement each function is changeable flexibly. In the above embodiment, the server 30 includes, as functional constituents, the vehicle managing portion 301, the vehicle selection portion 302, the observation request acquisition portion 303, the user information acquisition portion 304, the navigation command generation portion 305, the user information DB 311, the vehicle information DB 312, the option information DB 313, and the map information DB 314. However, some of or all of the functional constituents may be provided in the vehicle 10.

The present disclosure can be achieved in such a manner that a computer program to implement the functions described in the above embodiment is supplied to a computer, and one or more processors provided in the computer reads and executes the program. Such a computer program may be provided to the computer by a non-transitory computer-readable storage medium connectable to a system bus of the computer or may be provided to a computer via a network. Examples of the non-transitory computer-readable medium include a disk of a given type such as a magnetic disk (a floppy (registered trademark) disk, a hard disk drive (HDD), and the like) or an optical disk (a CD-ROM, a DVD disc, a Blu-ray disc, or the like), a reading only memory (ROM), a random access memory (RAM), an EPROM, an EEPROM, a magnetic card, a flash memory, an optical card, and a medium of a given type that is suitable to store an electronic order.

What is claimed is:

1. An information processing device, comprising:
control circuitry configured to
acquire information about a through-point, being a first physical location, corresponding to a selection object selected by a user terminal from among selection objects installable in a movable body having a base state;
acquire information about a destination output from the user terminal as a second physical location where a user observes the movable body in a state where the selection object selected by the user terminal is installed in the movable body; and
generate and transmit, to the movable body, a navigation command that causes the movable body to first physically travel to the through-point where the selection object selected by the user terminal is installed in the movable body, and then cause the movable body to physically travel to the destination so that the user observes the movable body with the selection object installed in the movable body at the destination.

2. The information processing device according to claim 1, wherein, when the user terminal selects a plurality of selection objects, the control circuitry is further configured to generate the navigation command so that the movable body physically travels to a plurality of through-points corresponding to the selection objects, in accordance with an installation order of the plurality of selection objects to be installed in the movable body, before travelling to the destination.

3. The information processing device according to claim 1, wherein the control circuitry is further configured to select the movable body having the base state, based on the information output from the user terminal.

4. An information processing method, comprising:
acquiring, by processing circuitry, information about a through-point, being a first physical location, corresponding to a selection object selected by a user terminal from among selection objects installable in a movable body having a base state;
acquiring, by the processing circuitry, information about a destination output from the user terminal as a second physical location where a user observes the movable body in a state where the selection object selected by the user terminal is installed in the movable body; and
generating and transmitting to the movable body, by the processing circuitry, a navigation command that causes the movable body to first physically travel to the through-point where the selection object selected by the user terminal is installed in the movable body, and then cause the movable body to physically travel to the destination so that the user observes the movable body with the selection object installed in the movable body at the destination.

5. A non-transitory computer-readable medium storing a program, which when executed by a computer, causes the computer to execute:
acquisition of information about a through-point, being a first physical location, corresponding to a selection object selected by a user terminal from among selection objects installable in a movable body having a base state;
acquisition of information about a destination output from the user terminal as a second physical location where a user observes the movable body in a state where the selection object selected by the user terminal is installed in the movable body; and
generation and transmission, to the movable body, of a navigation command that causes the movable body to first physically travel to the through-point where the selection object selected by the user terminal is installed in the movable body, and then cause the movable body to physically travel to the destination so that the user observes the movable body with the selection object installed in the movable body at the destination.

6. The information processing device of claim 1, wherein the control circuitry is further configured to acquire, from the user, a model home identifier, and select, as the movable body, a vehicle corresponding to the model home identifier.

* * * * *